United States Patent Office 3,290,290
Patented Dec. 6, 1966

3,290,290
ALIPHATIC KETO PENICILLINS
Leon John Heuser, Princeton, and Carl Francis Anderson, Milltown, N.J., assignors, by mesne assignments, to E. R. Squibb & Sons, Inc., New York, N.Y., a corporation of Delaware
No Drawing. Filed Jan. 30, 1964, Ser. No. 341,441
9 Claims. (Cl. 260—239.1)

This invention relates to aliphatic keto penicillins and the salts thereof. More particularly, the invention relates to compounds of the formula (I)

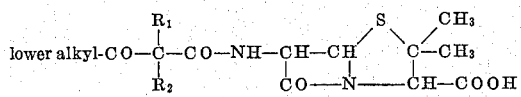

and to salts of said compounds.

$R_1$ and $R_2$ in the above formula each represents hydrogen and lower alkyl.

The lower alkyl groups include straight and branched chain aliphatic hydrocarbon groups such as methyl, ethyl, propyl, isopropyl, butyl, isobutyl, t-butyl, amyl and the like.

The acid of Formula I forms basic salts with substances such as the alkali metals, sodium and potassium in particular, and secondary and tertiary amines, such as N,N'-dibenzyl ethylene diamine, procaine, etc.

The novel compounds of this invention are produced by reacting an unsaturated β-lactone of Formula II, e.g., diketene, or an acid halide preferably chloride, of Formula III

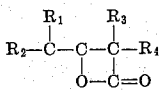

(III)

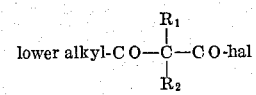

with 6-aminopenicillanic acid or a salt thereof. $R_1$, $R_2$, $R_3$ and $R_4$ in Formulas II and III each represents hydrogen or lower alkyl and hal represents halogen, preferably chlorine. In acid medium, e.g., in the presence of HCl, the free acid of Formula I is produced. In the presence of a basic material, the salt form is produced, e.g., by reaction with sodium hydroxide, potassium hydroxide or a tertiary amine, i.e., triethylamine, etc., and the like, in aqueous or organic medium.

The new compounds are useful as antimicrobial agents being effective against bacteria, e.g., gram positive organisms of the genera Staphylococcus, Streptococcus, Bacillus and Sarcina and gram negative organisms of the genera Proteus, Escherichia and Aerobacter. They may be administered orally in the form of tablets, capsules, suspensions or the like, and parenterally in injectable form, by incorporating a physiologically acceptable form in a dosage of about 10 to about 500 mg. together with conventional carriers, binders, excipients and the like according to accepted compounding practice.

The following examples are illustrative of the invention. Temperatures are all expressed on the centigrade scale.

Example 1

10 grams of 6-aminopenicillanic acid are slurried in 200 ml. of water and 40% sodium hydroxide is added until the pH is adjusted to 7.5, at which point a clear solution is obtained. 4.5 gms. of diketene in 50 ml. of acetone are added slowly with agitation over a period of 70 minutes maintaining a temperature of 25 to 28°. The pH is maintained at 7.5 by the addition of dilute sodium hydroxide. The solution is then agitated for 1 hour at room temperature.

The solution is extracted with 2 x 100 ml. of methylisobutylketone discarding the organic solvent layer. The aqueous layer is then mixed with a third portion of 100 ml. of methylisobutylketone and cooled to 5°. The pH is adjusted to 2.0 with concentrated hydrochloric acid and after 5 minutes the phases are separated. The aqueous phase is extracted a second time with 100 ml. of methylisobutylketone at pH 2.0 and the solvent layers combined. 100 ml. of cold water are added and the mixture adjusted to pH 6.8 with 20% potassium hydroxide. After the second aqueous extraction, the aqueous layers are combined and freeze dried.

The freeze dried 6-acetoacetamido penicillanic acid, potassium salt, is then subjected to a second reverse extraction using a water-isobutylacetate system. The 6-acetoacetamido penicillanic acid, potassium salt, is crystallized by mixing the aqueous solution with butyl alcohol and removing the water under reduced pressure. The compound melts at 237–238° (dec.).

Example 2

5 gms. of 6-aminopenicillanic acid are dissolved in 100 ml. of water adding 40% sodium hydroxide to pH 7.6. 4.5 gms. of α,α,γ-trimethyl-β-oxovaleryl chloride in 50 ml. of acetone are added slowly over a period of 1 hour. 10% sodium hydroxide is added to maintain a pH of 7.0–7.5. After agitating for an additional hour at room temperature, the 6-(α,α,γ-trimethyl - β - oxovaleramido) penicillanic acid, potassium salt, is recovered by extraction with methylisobutylketone as described in Example 1. After reverse extraction in a water-isobutyl acetate system as in Example 1, the crystalline potassium salt is obtained from butyl alcohol, M.P. 216–218° C. (dec.).

Example 3

By substituting β-ketovaleryl chloride for the α,α,γ-trimethyl-β-oxovaleryl chloride in the procedure of Example 2, β-oxovaleramidopenicillanic acid, potassium salt, is obtained.

What is claimed is:
1. A compound selected from the group consisting of acids of the formula

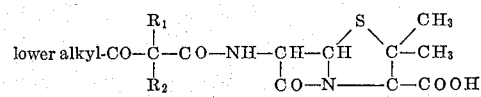

wherein $R_1$ and $R_2$ each is a member of the group consisting of hydrogen and lower alkyl, and salts of said acids with bases.

2. A compound of the formula

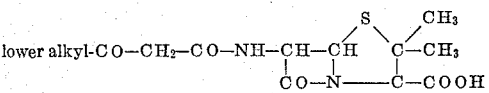

3. Alkali metal salt of a compound of claim 2.
4. A compound of the formula

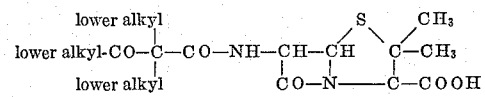

5. Alkali metal salt of a compound of claim 4.
6. 6-acetoacetamidopenicillanic acid.
7. Alkali metal salt of the compound of claim 6.

8. 6-(α,α,γ-trimethyl - β - oxovaleramido)penicillanic acid.

9. Alkali metal salt of the compound of claim 8.

References Cited by the Examiner

UNITED STATES PATENTS

| | | | |
|---|---|---|---|
| 2,754,293 | 7/1956 | Brody et al. | 260—562 |
| 3,051,742 | 8/1962 | Ehrhart et al. | 260—562 |
| 3,159,617 | 12/1964 | Sheehan | 260—239.1 |
| 3,174,964 | 3/1965 | Hobb et al. | 260—239.1 |

NICHOLAS S. RIZZO, *Primary Examiner.*

HENRY R. JILES, *Examiner.*

J. W. ADAMS, JR., *Assistant Examiner.*